(12) United States Patent
Hillan et al.

(10) Patent No.: US 9,331,744 B2
(45) Date of Patent: May 3, 2016

(54) METHODS AND APPARATUS FOR IMPROVING COLLISION RESOLUTION AMONG MULTIPLE NFC-A DEVICES

(71) Applicant: QUALCOMM Incorporated, San Diego, CA (US)

(72) Inventors: John Hillan, Farnborough (GB); Dubai Chingalande, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 13/745,453

(22) Filed: Jan. 18, 2013

(65) Prior Publication Data

US 2013/0309967 A1     Nov. 21, 2013

Related U.S. Application Data

(60) Provisional application No. 61/649,081, filed on May 18, 2012.

(51) Int. Cl.
| | |
|---|---|
| *H04B 5/00* | (2006.01) |
| *H02J 17/00* | (2006.01) |
| *G06K 7/10* | (2006.01) |

(52) U.S. Cl.
CPC .............. *H04B 5/00* (2013.01); *G06K 7/10237* (2013.01)

(58) Field of Classification Search
CPC .................................. H04B 1/59; G06K 17/00
See application file for complete search history.

(56) References Cited

U.S. PATENT DOCUMENTS

| | | | |
|---|---|---|---|
| 7,209,706 B2 * | 4/2007 | Fujii et al. | 455/41.2 |
| 7,734,307 B2 | 6/2010 | Dawidowsky | |
| 8,068,011 B1 | 11/2011 | Sajadi et al. | |
| 8,213,860 B2 | 7/2012 | Teruyama et al. | |
| 2002/0130766 A1 | 9/2002 | Hulvey | |
| 2005/0077356 A1 * | 4/2005 | Takayama et al. | 235/451 |

(Continued)

FOREIGN PATENT DOCUMENTS

| | | |
|---|---|---|
| EP | 1431904 A2 | 6/2004 |
| EP | 1845694 A1 | 10/2007 |
| EP | 2365676 A1 | 9/2011 |

OTHER PUBLICATIONS

NFCForum—TS—DigitalProtocol—1.0 dated Nov. 17, 2010.*

(Continued)

*Primary Examiner* — Cindy Trandai
(74) *Attorney, Agent, or Firm* — Joseph Hanasz

(57) ABSTRACT

Aspects disclosed herein relate to providing an improved collision resolution mechanism for handling multiple NFC-A devices where one or more of the NFC-A devices may not support SDD. In one example, a communications device is equipped to determine that a remote NFC device of two or more remote NFC devices supports SDD, resolve the remote NFC device of the two or more remote NFC devices using SDD, and determine whether a remaining remote NFC device of the two or more remote NFC devices supports SDD. In an aspect in which the remaining remote NFC device does not support SDD, the communications device may be equipped to set a flag indicating that unresolved remote NFC devices are present and/or send a read identifier (RID) message to the remaining remote NFC device.

32 Claims, 7 Drawing Sheets

(56) References Cited

U.S. PATENT DOCUMENTS

| | | | |
|---|---|---|---|
| 2008/0137862 | A1 | 6/2008 | Morita et al. |
| 2009/0147803 | A1* | 6/2009 | Takayama ............ G06K 7/0008 370/475 |
| 2009/0180451 | A1 | 7/2009 | Alpert et al. |
| 2010/0026454 | A1 | 2/2010 | Rowse et al. |
| 2010/0084918 | A1 | 4/2010 | Fells et al. |
| 2010/0130126 | A1* | 5/2010 | Takayama .................... 455/41.1 |
| 2010/0304770 | A1 | 12/2010 | Wietfeldt et al. |
| 2011/0159816 | A1 | 6/2011 | Takayama |
| 2012/0045989 | A1 | 2/2012 | Suumaki et al. |
| 2012/0077584 | A1* | 3/2012 | Sarmenta ........................ 463/31 |
| 2012/0206391 | A1 | 8/2012 | Kim et al. |
| 2012/0309531 | A1* | 12/2012 | Gong et al. ..................... 463/36 |
| 2012/0329405 | A1* | 12/2012 | Lee et al. ........................ 455/73 |
| 2013/0203351 | A1 | 8/2013 | Hillan et al. |

OTHER PUBLICATIONS

NFCForum—TS—DigitalProtocol—1.0 Nov. 17, 2010.*
Hillan J "Correction to NFC-A Collision Resolution Activity", Feb. 3, 2012, XP055059795, Retrieved from the Internet: URL: http://www.nfc -forum.org/apps/group_public/download.php/11097/Qualcomm%20Input%20Paper%20on%20NFC-A%20Collision%20Resolution.docx [retrieved on Apr. 16, 2013].
International Search Report and Written Opinion—PCT/US2013/041130—ISA/EPO—Sep. 27, 2013.
NFC Forum: "NFC Digital Protocol, Technical Specification, Digital 1.0", NFC Forum, Nov. 17, 2010, pp. 1-175, XP002712429, Wakefield, MA, USA, Retrieved from the Internet: URL:http://cwi.unik.no/images/NFC_forum_digital_protocol.pdf [retrieved on Sep. 6, 2013], p. 25-p. 34.

* cited by examiner

METHODS AND APPARATUS FOR IMPROVING COLLISION RESOLUTION AMONG MULTIPLE NFC-A DEVICES

CLAIM OF PRIORITY UNDER 35 U.S.C. §119

The present application for patent claims priority to Provisional Application No. 61/649,081 entitled "METHODS AND APPARATUS FOR IMPROVING COLLISION RESOLUTION AMONG MULTIPLE NFC-A DEVICES" filed May 18, 2012, and assigned to the assignee hereof and hereby expressly incorporated by reference herein.

REFERENCE TO CO-PENDING APPLICATIONS FOR PATENT

The present application for patent is related to the following provisional U.S. patent application, "METHODS AND APPARATUS FOR IMPROVING THE IDENTIFICATION OF MULTIPLE NFC-A DEVICES" by John Hillan, Dubai Chingalande, and Jeremy R. O'Donoghue, filed Feb. 2, 2012 under application No. 61/594,270, assigned to the assignee hereof, and expressly incorporated by reference herein.

BACKGROUND

The disclosed aspects relate generally to communications between and/or within devices and specifically to methods and systems for providing an improved collision resolution mechanism for handling multiple near field communication (NFC) device that support at least a NFC type-A radio frequency (RF) technology (e.g., NFC-A devices) where one or more of the NFC-A devices may not support single device detection (SDD).

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

The NFC Forum Activity specification defines a collision resolution procedure to use when resolving multiple devices, tags, and cards that use various NFC radio frequency (RF) technologies, such as but not limited to NFC-A, NFC-B, NFC-F, etc. As applied with respect to NFC-A, the process includes performance of a logical loop that is executed multiple times to differentiate each device in an operating volume (e.g., collision resolution). Further, as defined in version 1.0 of the NFC Forum Activity specification, a determination of whether NFC-A single device detection (SDD) is supported by any of the devices in the operating volume is made once at the beginning of the collision resolution logical loop (e.g., before the logical loop performs SDD). The collision resolution logical loop allows a polling device to receive a sensing response (SENS_RES) message as part of each iteration of the loop where each newly received sensing response message may indicate fewer collisions. Once the collision resolution logical loop has been entered, the polling device is continually prompted to send NFC-A SDD commands, even when, during the execution of the collision resolution logical loop, remaining device(s) that do not support SDD are uncovered.

Thus, improved apparatuses and methods for facilitating collision resolution among multiple NFC-A devices may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In accordance with one or more aspects and corresponding disclosure thereof, various aspects are described in connection with providing an improved collision resolution mechanism for handling multiple NFC-A devices where one or more of the NFC-A devices may not support SDD. In one example, a communications device is equipped to determine that a remote NFC device of two or more remote NFC devices supports SDD, resolve the remote NFC device of the two or more remote NFC devices using SDD, and determine whether a remaining remote NFC device of the two or more remote NFC devices supports SDD. In an aspect in which the remaining remote NFC device does not support SDD, the communications device may be equipped to set a flag indicating that unresolved remote NFC devices are present and/or send a read identifier (RID) message to the remaining remote NFC device.

According to related aspects, a method for providing an improved collision resolution mechanism for handling multiple NFC-A devices where one or more of the NFC-A devices may not support SDD is provided. The method can include determining that a remote NFC device of two or more remote NFC devices supports SDD. Further, the method can include resolving the remote NFC device of the two or more remote NFC devices using SDD. Moreover, the method may include determining whether a remaining remote NFC device of the two or more remote NFC devices supports SDD.

Another aspect relates to a communications apparatus enabled to provide an improved collision resolution mechanism for handling multiple NFC-A devices where one or more of the NFC-A devices may not support SDD. The communications apparatus can include means for determining that a remote NFC device of two or more remote NFC devices supports SDD. Further, the communications apparatus can include means for resolving the remote NFC device of the two or more remote NFC devices using SDD. Moreover, the communications apparatus can include means for determining whether a remaining remote NFC device of the two or more remote NFC devices supports SDD.

Another aspect relates to a communications apparatus. The apparatus can include a transceiver, a memory, a processor coupled to the memory, and a collision resolution module coupled to at least one of the memory or processor. The collision resolution module may be configured to determine that a remote NFC device of two or more remote NFC devices supports SDD, resolve the remote NFC device of the two or more remote NFC devices using SDD, and determine whether a remaining remote NFC device of the two or more remote NFC devices supports SDD.

Still another aspect relates to a computer program product, which can have a computer-readable medium including code for determining that a remote NFC device of two or more remote NFC devices supports SDD. Further, the computer-readable medium may include code for resolving the remote NFC device of the two or more remote NFC devices using SDD. Moreover, the computer-readable medium can include code for determining whether a remaining remote NFC device of the two or more remote NFC devices supports SDD.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described herein, during a collision resolution procedure a polling device may check to determine if any devices in an operating volume are operable to receive SDD commands. Further, when executing each pass through the collision resolution loop, the polling device may determine whether any of the remaining unresolved device(s) do not support SDD. In such an aspect, the polling device can decide not to send the NFC-A SDD commands. In an optional aspect, if the polling device determines that a remaining unresolved device is does not SDD (e.g., a Type 1 Tag), the polling device may decide to send a Type 1 Tag Read ID (RID) command instead of the NFC-A SDD commands.

Figure 1:
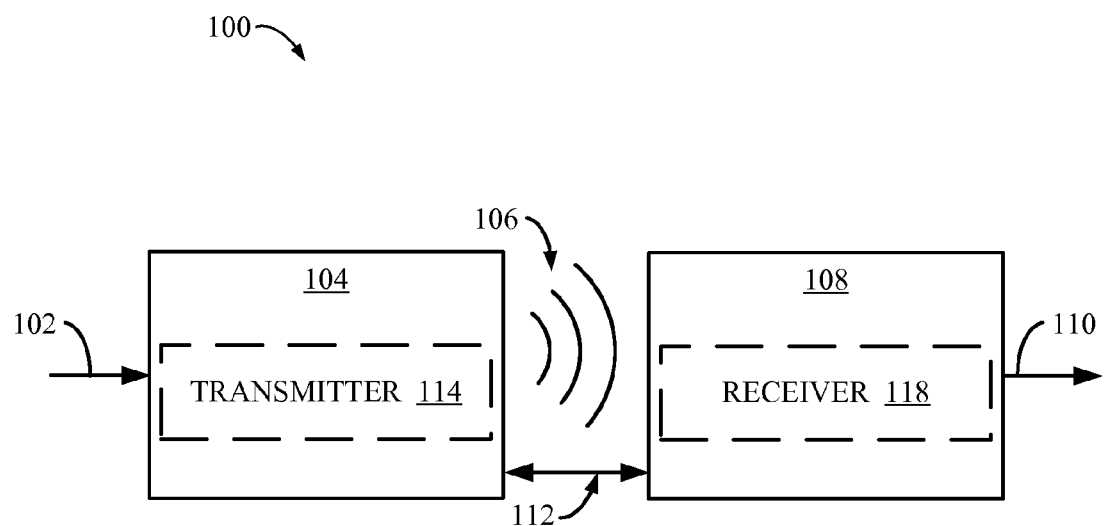
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
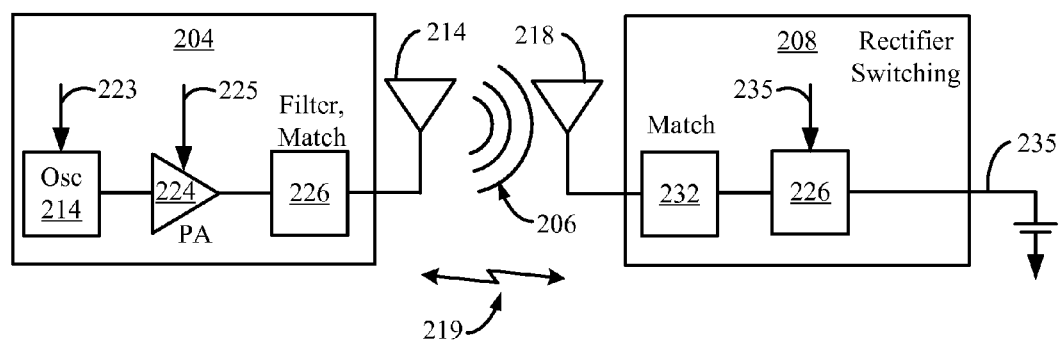
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 119 (e.g., Bluetooth, Zigbee, cellular, etc).

Figure 3:
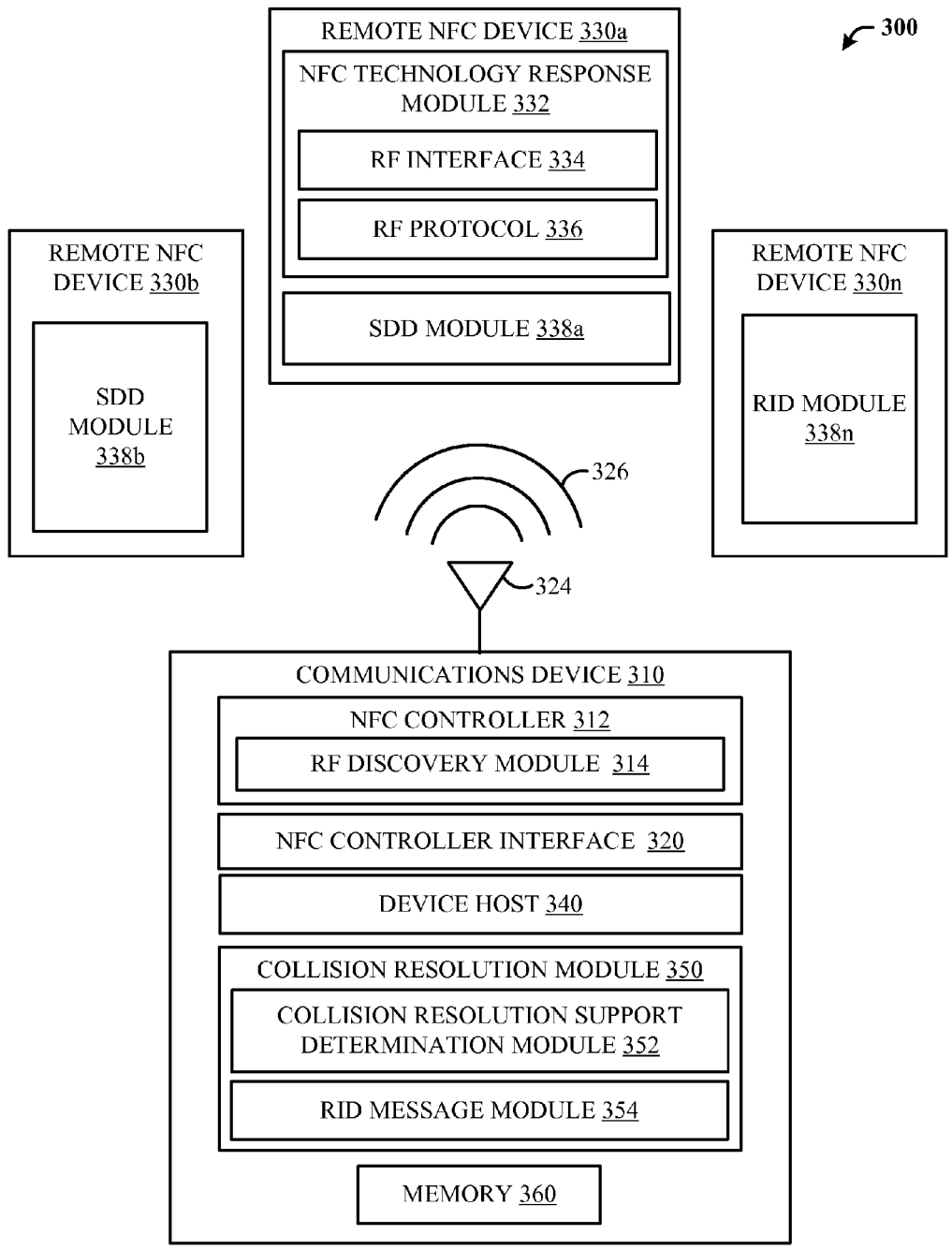
FIG. 3 is a block diagram of a NFC environment, according to an aspect.

With reference to FIG. 3, a block diagram of a communication network 300 according to an aspect is illustrated. Communication network 300 may include communications device 310 which, through antenna 324, may be within an operating volume of two or more remote NFC devices (330a, 330b, 330n). Each NFC device (310, 330a, 330b, 330n) in the communication network 300 may use one or more NFC RF technologies 326 (e.g., NFC-A, NFC-B, NFC-F, etc.). In an aspect, communications device 310, as part of a technology detection procedure, may use collision resolution module 350 to poll the operating volume in an attempt to detect the presence of and identify each of the remote NFC devices (330a, 330b, 330n). One or more of the remote NFC device (330a, 330b) may be include a SDD module (338a, 338b) that is operable to respond with a device sensing response message to the communications device 310 polling using NFC technology response module 332 through one or more RF interfaces 334 using one or more RF protocols 336. In another aspect, one or more of the remote NFC devices 330*n* may not be operable to perform collision resolution (e.g., a Type 1 tag). In such an aspect, the remote NFC device 330*n* may include a reader identifier (RID) processing module 338*n* that is operable to respond to a RID message from the communications device 310. In an aspect, each of the remote NFC devices (330*a*, 330*b*, 330*n*) may be operable to use a NFC-A RF technology while communicating with communications device 310.

In another aspect, communications device 310 may be operable to be connected to an access network and/or core network (e.g., a CDMA network, a GPRS network, a UMTS network, and other types of wireline and wireless communication networks). In an aspect, remote NFC devices (330*a*, 330*b*, 330*n*) may include but are not limited to a remote NFC tag, a peer initiator device, a remote peer target device, etc.

Communications device 310 may include NCI 320. In an aspect, NCI 320 may be operable to enable communications between device host (DH) 340 and NFC controller (NFCC) 312.

Communications device 310 may include a NFCC 312. In an aspect, NFCC 312 may include RF discovery module 314. RF discovery module 314 may be operable to perform RF discovery using a discovery process. One aspect of the discovery process may include polling for the presence of one or more remote NFC devices (330*a*, 330*b*, 330*n*) operable to communicate using a NFC-A RF technology. DH 340 may be operable to generate a command to prompt NFCC 312 to perform various functions associated with RF discovery.

Communications device 310 may include collision resolution module 350. Collision resolution module 350 may further include collision resolution support determination module 352 that may be operable to determine whether any of the remote NFC devices (330*a*, 330*b*, 330*n*) is not operable to support collision resolution (e.g., using SDD). In an aspect, where the collision resolution support determination module 352 determines one or more detected remote NFC devices (330*a*, 330*b*) are operable to use SDD through reception of one or more sensing response (SENS_RES) messages received from the one or more detected remote NFC devices (300*a*, 330*b*) in response to a device sensing request message (e.g., a SENS_REQ message as defined in the NFC Forum Digital Protocol specification) being transmitted. Collision resolution module 350 may receive one or more device sensing response messages from one or more remote NFC devices (330*a*, 330*b*) resulting in a received device sensing response that may include one or more collisions. In an aspect, each device sensing response message may be a SENS_RES message as defined in the NFC Forum Digital Protocol specification. During a subsequent iteration of a collision resolution process, collision resolution module 350 may further analyze the received device sensing response that includes one or more collisions and may determine in the detected one or more remote NFC devices are operable to use SDD. In an aspect, a remote NFC device 330*n* may be detected that does not support SDD. In such an aspect, collision resolution module 350 may terminate the collision resolution process with an indication that there is at least one remote NFC device 330*n* that may not be resolved. In another optional aspect, assuming one or more remote NFC devices have already been resolved (330*a*), then collision resolution module may be operable to prompt communications device 310 to transmit a reader identifier (RID) message module 354 to attempt to communicate with the remote NFC device 330*n* that is not operable to use SDD. In another aspect, where collision resolution module 350 initially detects the presence of one or more remote NFC devices 330*n* that are not operable to use SDD, then collision resolution module may be operable to prompt communications device 310 reader identifier (RID) message module 354 to generate a RID message in an attempt to communicate with the remote NFC device 330*n* that is not operable to use SDD. Although FIG. 3 depicts collision resolution module 350 is a separate module, one of ordinary skill in the art would appreciate that the functionality associated with collision resolution module 350 may be included within one or more components, such as but not limited to, NFCC 312, DH 340, etc.

Communications device 310 may include further include memory 360 that may be operable to store one or more parameters received in the one or more received device sensing response that include one or more collisions. In another aspect, each newly received device sensing response may be stored in memory 360 by writing over and/or deleting a previously stored device sensing response.

Accordingly, a system and method is disclosed to provide improved collision resolution for communications device 310 with multiple remote NFC devices 330*a*, 330*b*, 330*n*.

Figure 4:
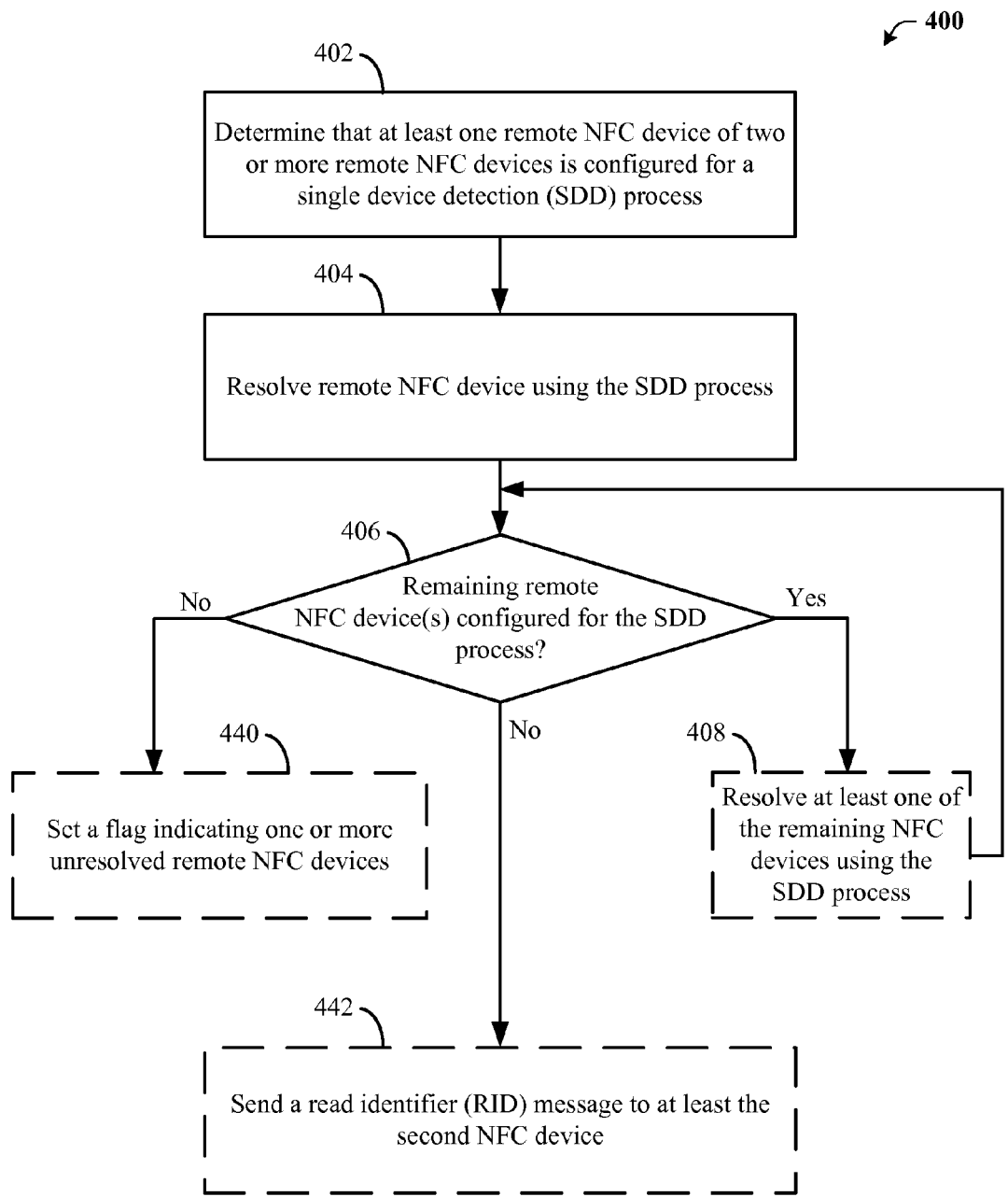
FIG. 4 is a flowchart describing an example of an improved collision process, according to an aspect.
Figure 5:
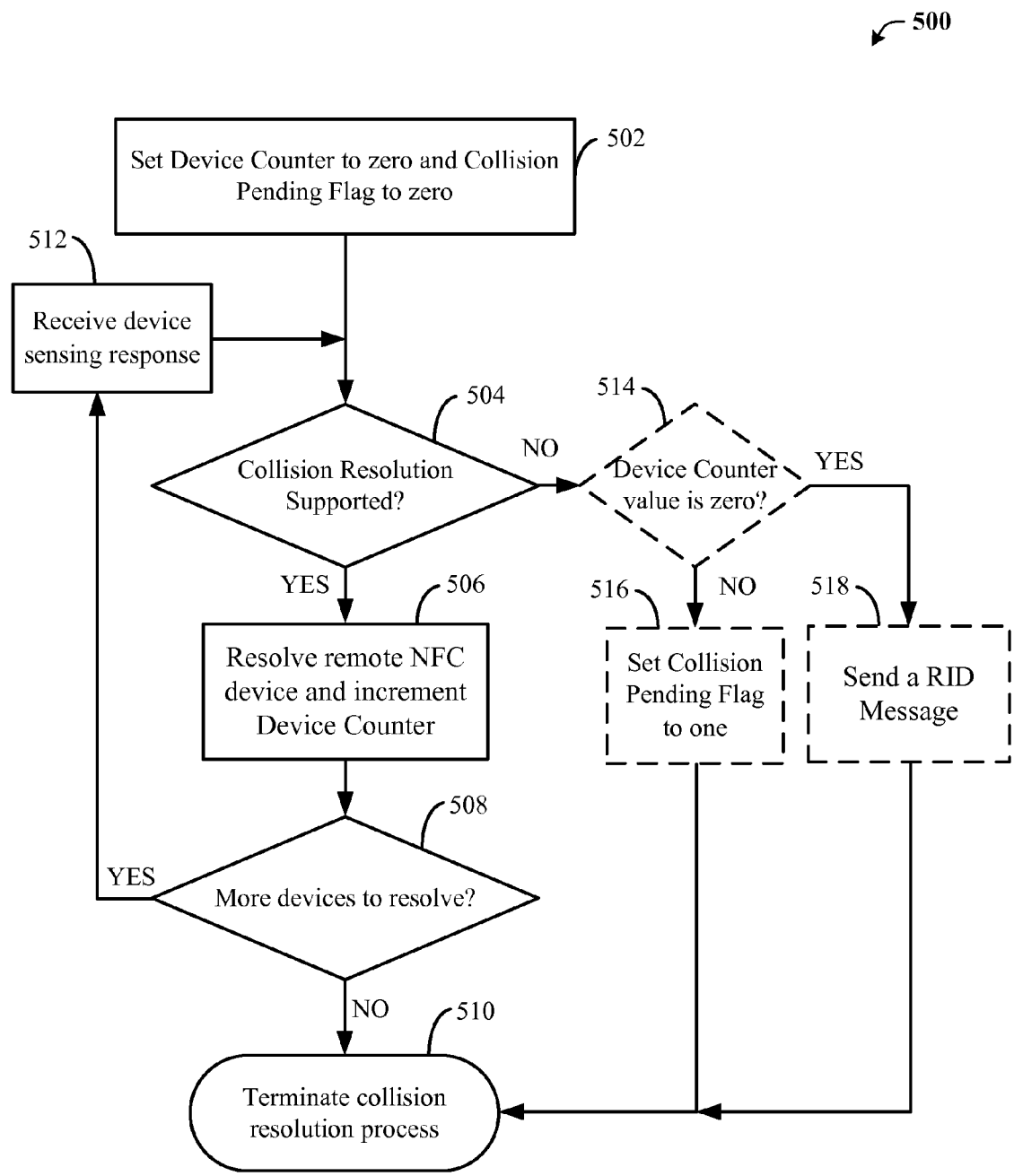
FIG. 5 is a flowchart describing an example of another improved collision process, according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts an example flowchart describing a process 400 for improving collision resolution in a communications environment in which multiple remote NFC devices are present.

At block 402, a NFC device may determine that a device sensing response message includes one or more collisions among a plurality of responding remote NFC devices. Further, the NFC device may determine that one or more of the detected remote NFC devices may be operable to perform SDD. In an aspect, the device sensing response by be stored by the NFC device. In such an aspect, the device sensing response message may include a SENS_RES message as defined in the NFC Forum Digital Protocol specification. In an aspect, each of the remote NFC devices may be operable to use NFC-A radio RF technology. In another aspect, the remote NFC devices operable to perform SDD may include any combination of a type 2 tag, a type 4 tag, a card, a peer device, etc.

At block 404, the NFC device may resolve at least one of the remote NFC devices using SDD commands. In an aspect, the remote NFC device may be a referred to as a first remote NFC device. As used herein, a first remote NFC device merely refers to one of multiple remote NFC devices that have been identified. One of ordinary skill in the art will appreciate that application of a "first" label only occurs in the context of identification of a remote NFC device and does not correspond to any ordering, ranking, and/or characterizing the multiple remote NFC devices. In an aspect, SDD communications, used as part of collision resolution, may include a NFCID that may identify each remote NFC device.

At block 406, the NFC device may determine whether one or more of the remaining unresolved remote NFC devices are operable to use SDD.

If at block 406, the NFC device determines that one or more of the remaining unresolved NFC devices are operable to use SDD, then at optional block 408, the NFC device may resolve one of the remaining remote NFC devices and the process may return to block 406.

By contrast, if at block 406, the NFC device determines that one or more of the remaining unresolved NFC devices are operable not to use SDD, then at optional block 410, the NFC device may set a flag indicating that there are one or more unresolved remote NFC devices in the operating space. In such an aspect, the flag may be an INT_COLL_PEND flag that is set to "1" to indicate a pending collision.

In another aspect, if at block 406, the NFC device determines that one or more of the remaining unresolved NFC devices are operable not to use SDD, then at optional block 412, the NFC device may send a read identifier (RID) message to any unresolved remote NFC devices. In such an aspect, a remote NFC device that is not able to use SDD may include a type 1 tag.

Accordingly, a process is described in which an improved collision resolution process is used by a NFC device.

FIG. 5 depicts an example flowchart describing another process 500 for improving collision resolution in a communications environment in which multiple remote NFC devices are present.

Initially, Version 1.0 of the NFC Forum Activity Forum Specification currently prompts a NFC device to set a device counter and a collision pending flag (e.g., INT_COLL_PEND) to zero prior to entering a collision resolution loop. Placing the block prior to the collision resolution loop results and after an anti-collision configuration (CON_ANTICOLL) flag results in potential inconsistencies with respect to subsequent actions that may be performed by the NFC device. Nevertheless, in an effort to provide a clear comparison with the current specification language, and without limiting the disclosed subject matter, the placement of the block has not be moved to be before the CON-ANTICOLL flag.

At block 502, as part of a collision resolution process various parameters may be set to default (e.g., zeroed) values. For example, a NFC device set a device counter to zero, a collision pending flag (e.g., INT_COLL_PEND) to zero, etc.

At block 504, the NFC device determines if collision resolution is supported. In an aspect, collision resolution may be supported where remote NFC devices are able to response to one or more SDD commands.

If at block 504, the NFC device determines that collision resolution is supported, then at block 506, the NFC device may resolve a remote NFC device. In an aspect, the NFC device may also increment the device counter to indicate that a remote NFC device has been resolved. Further, the NFC device may store a NFC device identifier (NFCID) associated with the remote NFC device of the two or more remote NFC devices.

At block 508, the NFC device may determine if one or more remote NFC devices remain unresolved.

If at block 508 the NFC device determines that there are no unresolved remote NFC devices within an operating volume, then at block 510, the NFC device may terminate the collision resolution process. In such an aspect, the NFC device may indicate that there are no remaining unresolved remote NFC devices by having the INT_COLL_PEND flag set to zero.

By contrast, if at block 508, the NFC device determines that one or more collisions remain pending, then at block 512, the NFC device may receive one or more device sensing responses.

Returning to block 504, in an optional aspect, if at block 504 the NFC device determines that a remote NFC device in the operating volume does not support collision resolution (e.g., SDD commands), then at optional block 514, the NFC device may determine whether the device counter is set to zero (e.g., there has been no successful collision resolution iterations). If at optional block 514, the NFC device determines the device counter is not set to zero, then at optional block 516, the NFC device may set a collision pending flag (INT_COLL_PEND) to "1" and the collision resolution process may be terminated at block 510. By contrast, if at optional block 514, the NFC device determines that the device counter is set to zero, then at optional block 518, the NFC device may transmit a RID message to attempt to communicate with a remote NFC device that is not operable to perform SDD.

In another optional aspect, irrespective of whether a device counter is set to zero, upon a determination that collision resolution is not supported (block 504), at optional block 518, the NFC device may transmit a RID message to attempt to communicate with a remote NFC device that is not operable to perform SDD.

Figure 6:
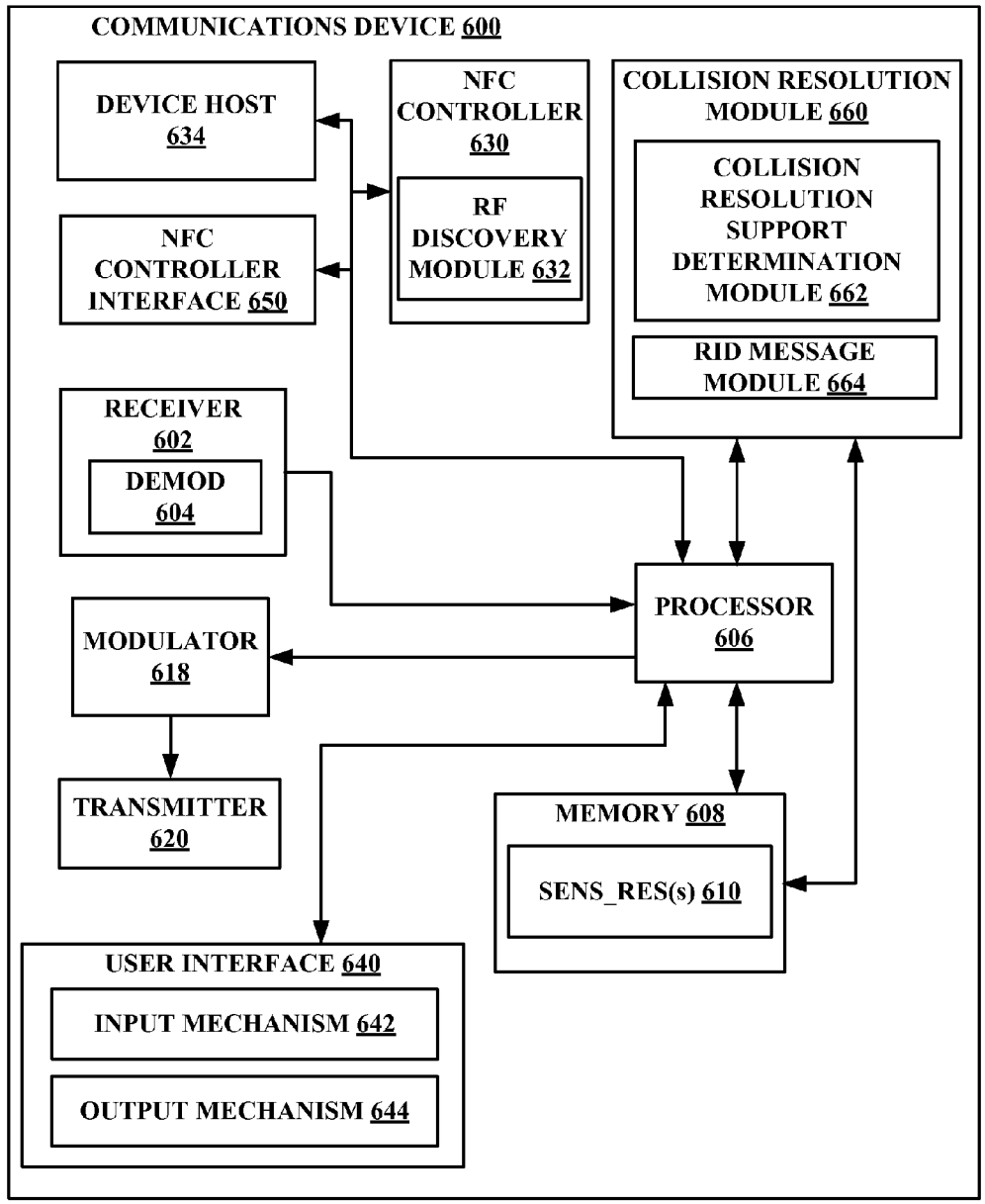
FIG. 6 is a functional block diagram of an example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC peer mode connection establishment. In an aspect, memory 608 may store one or more device sensing responses 610. In an optional aspect, memory 608 may further store each received device sensing response 610 in a device sensing response table.

Further, processor 606, DH 634, NFCC 630, and/or collision resolution module 660 can provide means for determining that a remote NFC device of two or more remote NFC devices supports SDD, means for resolving the remote NFC device of the two or more remote NFC devices using SDD, and means for determining whether a remaining remote NFC device of the two or more remote NFC devices supports SDD.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory. In an aspect, memory 608 may further include one or more received device sensing responses (SENS_RES) 610 received as part of a collision resolution process.

Communications device 600 may include a NFCC 630 and DH 634. In an aspect, NFCC 630 may include RF discovery module 632. RF discovery module 632 may be operable to perform a discovery process. One aspect of the discovery process may include polling for the presence of one or more remote NFC devices operable to communicate using a NFC-A RF technology. DH 634 may be operable to generate a command to prompt NFCC 630 to perform various functions associated with RF discovery.

In another aspect, communications device 600 may include NCI 650. In an aspect, NCI 650 may be operable to enable communications between NFCC 630 and DH 634. NCI 650 may be operable to function in a listening mode and/or a polling mode.

In another aspect, communications device 600 may include collision resolution module 660. Collision resolution module 660 may further include collision resolution support determination module 662 that may be operable to determine whether any of the remote NFC devices is not operable to support collision resolution (e.g., using SDD). In an aspect, where the collision resolution support determination module 662 determines one or more detected remote NFC devices are operable to use SDD through reception of one or more sensing response (SENS_RES) messages received from the one or more detected remote NFC devices in response to a device sensing request message (e.g., a SENS_REQ message as defined in the NFC Forum Digital Protocol specification) being transmitted. Collision resolution module 660 may receive one or more device sensing response messages from one or more remote NFC devices resulting in a received device sensing response that may include one or more collisions. In an aspect, each device sensing response message may be a SENS_RES message as defined in the NFC Forum Digital Protocol specification. During a subsequent iteration of a collision resolution process, collision resolution module 660 may further analyze the received device sensing response that includes one or more collisions and may determine in the detected one or more remote NFC devices are operable to use SDD. In an aspect, a remote NFC device may be detected that does not support SDD. In such an aspect, collision resolution module 660 may terminate the collision resolution process with an indication that there is at least one remote NFC device that may not be resolved. In another optional aspect, assuming one or more remote NFC devices have already been resolved, then collision resolution module may be operable to prompt communications device 600 reader identifier (RID) message module 664 generate a RID message to attempt to communicate with the remote NFC device that is not operable to use SDD. In another aspect, where collision resolution module 660 initially detects the presence of one or more remote NFC devices that are not operable to use SDD, then collision resolution module may be operable to prompt communications device 600 to transmit a reader identifier (RID) message 664 to attempt to communicate with the remote NFC device that is not operable to use SDD. Although FIG. 6 depicts collision resolution module 660 is a separate module, one of ordinary skill in the art would appreciate that the functionality associated with collision resolution module 660 may be included within one or more components, such as but not limited to, NFCC 630, DH 634, etc. In another aspect, collision resolution module 660 may operable to perform collision resolution processes described with respect to FIGS. 4-5.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touchscreen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display operable to present media content that is in image or video format or an audio speaker to present media content that is in an audio format.

Figure 7:
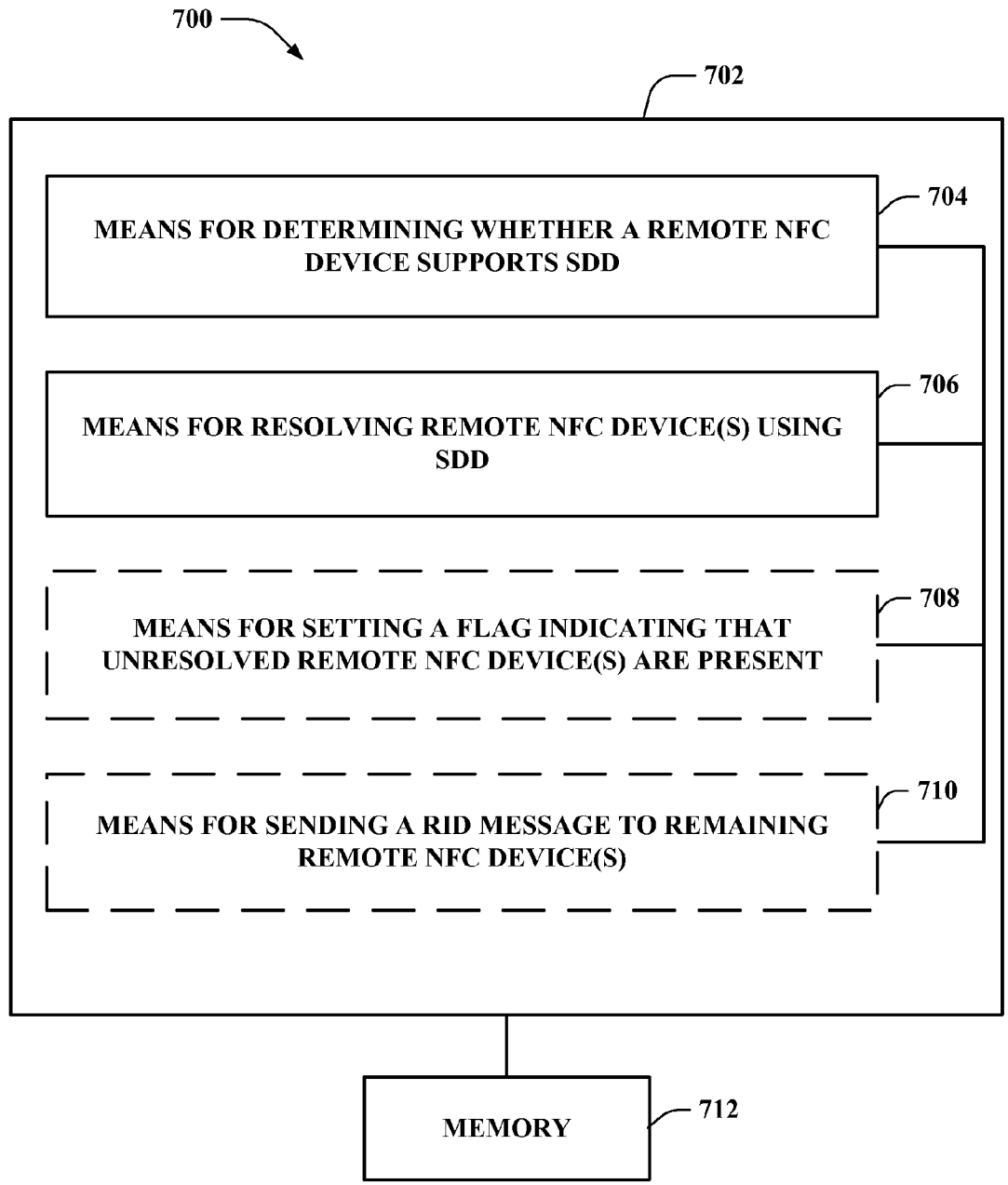
FIG. 7 is a functional block diagram of an example communication system for improving technology detection among multiple NFC-A devices, according to an aspect.

FIG. 7 depicts another depicts a block diagram of an exemplary communication system 700 configured to provide an improved collision resolution mechanism for handling multiple NFC-A devices where one or more of the NFC-A devices may not support SDD, according to an aspect. For example, system 700 can reside at least partially within a communications device (e.g., communications device 600). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for determining that a remote NFC device supports SDD 704. For example, in an aspect, the means for performing the collision resolution 704 can include DH 634, NFCC 630, collision resolution module 660, and/or processor 606 of communications device 600. In an aspect, the means for determining that a remote NFC device supports SDD 704 may be configured to determine that a remote NFC device of two or more remote NFC devices supports SDD. In another aspect, the means for determining that a remote NFC device supports SDD 704 may be configured to us the device sensing response message received after a remote NFC device has been resolved and put to sleep. In an aspect, the device sensing response message may be a SENS_RES message as defined in the NFC Forum Digital Protocol specification. In an aspect, the remote NFC devices may be operable to use NFC-A RF technology.

Further, logical grouping 702 can include an electrical component that may provide means for resolving one or more remote NFC devices using SDD 706. For example, in an aspect, the means for determining 706 can include DH 634, NFCC 630, collision resolution module 660, and/or processor 606 of communications device 600. In an aspect, the means for resolving 706 may be configured to resolving a remote NFC device determined to support SDD and/or a remaining remote NFC device determine to support SDD. In another aspect, the means for resolving 706 may be configured to obtain a NFCID. In another aspect, the means for resolving 706 may be configured to receive a device sensing response message after a previously resolved remote NFC device was put to sleep. In such an aspect, as the previously resolved remote NFC device is asleep, it may not contribute to any collisions observed in the device sensing response message, and as such, the received device sensing response message may contain fewer collisions. In an aspect, the remote NFC device of the two or more remote NFC devices may be of a type 2 tag, a type 4 tag, a card, a peer device, etc.

In an optional aspect, logical grouping 702 can include an electrical component that may provide means for setting a flag indicating that one or more unresolved remote NFC devices are present upon a determination that the remaining remote NFC device does not support SDD 708. For example, in an aspect, the means for setting 708 can include DH 634, NFCC 630, collision resolution module 660, and/or processor 606 of communications device 600. In an aspect, the flag may be an INT_COLL_PEND flag that is set to "1" to indicate a pending collision.

In another optional aspect, logical grouping 702 can include an electrical component that may provide means for sending a RID message to the remaining remote NFC device of the two or more NFC devices upon a determination that the remaining remote NFC device does not support SDD 710. For example, in an aspect, the means for sending 710 can include transmitter 620, DH 634, NFCC 630, collision resolution module 660, and/or processor 606 of communications device 600. In an aspect, the remaining remote NFC device may be a type 1 tag.

Additionally, system 700 can include a memory 712 that retains instructions for executing functions associated with the electrical components 704, 706, 708, and 710, stores data used or obtained by the electrical components 704, 706, 708, 710, etc. While shown as being external to memory 712, it is to be understood that one or more of the electrical components 704, 706, 708, and 710 may exist within memory 712. In one example, electrical components 704, 706, 708, and 710 can include at least one processor, or each electrical component 704, 706, 708, and 710 can be a corresponding module of at least one processor. Moreover, in an additional or alternative example, electrical components 704, 706, 708, and 710 may be a computer program product including a computer readable medium, where each electrical component 704, 706, 708, and 710 may be corresponding code. In an aspect, for example, memory 712 may be the same as or similar to memory 608 (FIG. 6). In another aspect, memory 712 may be associated with DH 634, NFCC 630, and/or Collision resolution module 660.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communications device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "hXemploys A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communication, comprising:
    determining that a remote near field communication (NFC) device of two or more remote NFC devices supports single device detection (SDD) based on reception of one or more sensing response (SENS_RES) messages from the remote NFC device in response to a device sensing request message (SENS_REQ) transmitted to the two or more remote NFC devices;
    resolving the remote NFC device of the two or more remote NFC devices using SDD commands;
    determining whether a remaining remote NFC device of the two or more remote NFC devices supports SDD in response to resolving the remote NFC device;
    resolving the remaining remote NFC device using SDD commands upon a determination that the remaining remote NFC device supports SDD; and
    setting a flag indicating that one or more unresolved remote NFC devices are present upon a determination that the remaining remote NFC device does not support SDD.

2. The method of claim 1, further comprising:
    sending a read identifier (RID) message to the remaining remote NFC device of the two or more remote NFC devices upon a determination that the remaining remote NFC device does not support SDD.

3. The method of claim 2, wherein the remaining remote NFC device is a type 1 tag.

4. The method of claim 1, wherein each of the two or more remote NFC devices is operable to use NFC-A radio frequency (RF) technology.

5. The method of claim 1, wherein the remote NFC device of the two or more remote NFC devices is one of a type 2 tag, a type 4 tag, a card, or a peer device.

6. The method of claim 1, wherein resolving the remote NFC device of the two or more remote NFC devices further comprises obtaining a NFC device identifier (NFCID).

7. The method of claim 1, wherein the resolving further comprises receiving a device sensing response message after the remote NFC device is put to sleep.

8. The method of claim 7, wherein the device sensing response message is a SENS_RES message as defined in a NFC Forum Digital Protocol specification.

9. A non-transitory computer-readable medium comprising code for:
  determining that a remote near field communication (NFC) device of two or more remote NFC devices supports single device detection (SDD) based on reception of one or more sensing response (SENS_RES) messages from the remote NFC device in response to a device sensing request message (SENS_REQ) being transmitted to the two or more remote NFC devices;
  resolving the remote NFC device of the two or more remote NFC devices using SDD commands;
  determining whether a remaining remote NFC device of the two or more remote NFC devices supports SDD in response to resolving the remote NFC device;
  resolving the remaining remote NFC device using SDD commands upon a determination that the remaining remote NFC device supports SDD; and
  setting a flag indicating that one or more unresolved remote NFC devices are present upon a determination that the remaining remote NFC device does not support SDD.

10. The non-transitory computer-readable medium of claim 9, further comprising code for:
  sending a read identifier (RID) message to the remaining remote NFC device of the two or more remote NFC devices upon a determination that the remaining remote NFC device does not support SDD.

11. The non-transitory computer-readable medium of claim 10, wherein the remaining remote NFC device is a type 1 tag.

12. The non-transitory computer-readable medium of claim 9, wherein each of the two or more remote NFC devices is operable to use NFC-A radio frequency (RF) technology.

13. The non-transitory computer-readable medium of claim 9, wherein the remote NFC device of the two or more remote NFC devices is one of a type 2 tag, a type 4 tag, a card, or a peer device.

14. The non-transitory computer-readable medium of claim 9, further comprising code for obtaining a NFC device identifier (NFCID).

15. The non-transitory computer-readable medium of claim 9, further comprising code for:
  receiving a device sensing response message after the remote NFC device is put to sleep; and
  using the device sensing response message.

16. The non-transitory computer-readable medium of claim 15, wherein the device sensing response message is a SENS_RES message as defined in a NFC Forum Digital Protocol specification.

17. An apparatus for communications, comprising:
  means for determining that a remote near field communication (NFC) device of two or more remote NFC devices supports single device detection (SDD) based on reception of one or more sensing response (SENS_RES) messages from the remote NFC device in response to a device sensing request message (SENS_REQ) being transmitted to the two or more remote NFC devices;
  means for resolving the remote NFC device of the two or more remote NFC devices using SDD commands;
  wherein the means for determining is further configured to determine whether a remaining remote NFC device of the two or more remote NFC devices supports SDD in response to resolving the remote NFC device;
  wherein the means for resolving is further configured to resolve the remaining remote NFC device using SDD commands upon a determination that the remaining remote NFC device supports SDD; and
  means for setting a flag indicating that one or more unresolved remote NFC devices are present upon a determination that the remaining remote NFC device does not support SDD.

18. The apparatus of claim 17, further comprising:
  means for sending a read identifier (RID) message to the remaining remote NFC device of the two or more remote NFC devices upon a determination that the remaining remote NFC device does not support SDD.

19. The apparatus of claim 18, wherein the remaining remote NFC device is a type 1 tag.

20. The apparatus of claim 17, wherein each of the two or more remote NFC devices is operable to use NFC-A radio frequency (RF) technology.

21. The apparatus of claim 17, wherein the remote NFC device of the two or more remote NFC devices is one of a type 2 tag, a type 4 tag, a card, or a peer device.

22. The apparatus of claim 17, wherein the means for resolving is further configured to obtain a NFC device identifier (NFCID).

23. The apparatus of claim 17, wherein the means for resolving is further configured to receive a device sensing response message after the remote NFC device is put to sleep.

24. The apparatus of claim 23, wherein the device sensing response message is a SENS_RES message as defined in a NFC Forum Digital Protocol specification.

25. An apparatus for NFC communications, comprising:
  a transceiver;
  a memory;
  a processor coupled to the memory; and
  a collision resolution module coupled to at least one of the memory or the processor and configured to:
    determine that a remote near field communication (NFC) device of two or more remote NFC devices supports single device detection (SDD) based on reception of one or more sensing response (SENS_RES) messages from the remote NFC device in response to a device sensing request message (SENS_REQ) being transmitted to the two or more remote NFC devices;
    resolve the remote NFC device of the two or more remote NFC devices using SDD commands;
    determine whether a remaining remote NFC device of the two or more remote NFC devices supports SDD in response to resolving the remote NFC device;
    resolve the remaining remote NFC device using SDD commands upon a determination that the remaining remote NFC device supports SDD; and
    set a flag indicating that one or more unresolved remote NFC devices are present upon a determination that the remaining remote NFC device does not support SDD.

26. The apparatus of claim 25, wherein the collision resolution module is further configured to:
  send a read identifier (RID) message to the remaining remote NFC device of the two or more remote NFC devices upon a determination that the remaining remote NFC device does not support SDD.

27. The apparatus of claim 26, wherein the remaining remote NFC device is a type 1 tag.

28. The apparatus of claim 25, wherein each of the two or more remote NFC devices is operable to use NFC-A radio frequency (RF) technology.

29. The apparatus of claim 25, wherein the remote NFC device of the two or more remote NFC devices is one of a type 2 tag, a type 4 tag, a card, or a peer device.

30. The apparatus of claim 25, wherein the collision resolution module is further configured to obtain a NFC device identifier (NFCID).

31. The apparatus of claim 25, wherein the collision resolution module is further configured to:
   receive a device sensing response message after the remote NFC device is put to sleep; and
   use the device sensing response message.

32. The apparatus of claim 31, wherein the device sensing response message is a SENS_RES message as defined in a NFC Forum Digital Protocol specification.

* * * * *